UNITED STATES PATENT OFFICE.

ISRAEL SCHLOSSBERG, OF CHARLOTTENBURG, GERMANY.

METHOD OF PRODUCING ACID AND FIRE PROOF BODIES.

961,651.

Specification of Letters Patent.  Patented June 14, 1910.

No Drawing.

Application filed April 23, 1909. Serial No. 491,725.

*To all whom it may concern:*

Be it known that I, ISRAEL SCHLOSSBERG, a subject of the Emperor of Russia, residing at Charlottenburg, Berlin, in the Empire of Germany, have invented a new and useful Method of Producing Acid and Fire Proof Bodies, of which the following is a specification.

My invention relates to a method of producing acid- and fire-proof bodies which consist of pure silicic acid anhydrid. The method is characterized in that natural or artificial masses consisting of silicic acid soaked in a known manner with solutions of water-glass are conveniently formed, then impregnated with a sufficient quantity of silicofluoric acid, and thereupon burned until the formed silicofluorid of sodium or the fluorid of silicon and the fluorid of sodium obtained by the decomposition of this silicofluorid of sodium are driven off. When the masses of silica, for example quartz or sand, having been soaked with solutions of water-glass and formed into bodies, are now impregnated with a sufficient quantity of silicofluoric acid, the latter will act upon the silicates in the manner, as is known, that according to the equation

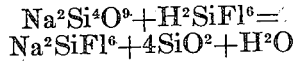
$$Na^2Si^4O^9 + H^2SiFl^6 = Na^2SiFl^6 + 4SiO^2 + H^2O$$

pure silicic acid anhyrid and silicofluorid of sodium are formed. If the mass is now heated, it is possible according to the temperature to drive off either the silicofluorid of sodium as such, or if at a higher temperature it is decomposed, to drive off first the volatile fluorid of silicon, and after an increase of the temperature also the fluorid of sodium, so that the product left behind, for example a stone, a vessel, or the like, consists of pure silicic acid anhydrid.

The driven-off fluorid of silicon is collected in water in a suitable condenser, where it turns into silicofluoric acid while silicic acid is separated. This silicofluoric acid can be again used over in the said method.

The fluorid of sodium can be employed as such, or in case no importance is attached to the separation of the fluorid of silicon and of the fluorid of sodium, the impregnated bodies are at once heated up to such a temperature, at which both the fluorid of silicon and the fluorid of sodium are simultaneously driven off, so that silicofluorid of sodium is obtained as a by-product.

The method described can be modified in that instead of the solutions of potassium or sodium water-glass dry alkali silicates are employed, and that the mixture formed from them and the silicic acid anhydrid is soaked with water and the soaked mass is formed into bodies, after which the bodies are treated as before. The result is the same, the only difference in the process being in the time when the water is added to the alkali silicates. In the first method, the water is added to the alkali silicates (producing a solution of water-glass) before they are added to the other ingredients, whereas in the second method, dry alkali silicates are used and the mixture afterward soaked with water.

I claim:

1. The herein described method of producing acid- and fire-proof bodies of pure silicic acid anhydrid, which consists in soaking masses of silicic acid (silica, quartz, sand) with solutions of water-glass, forming bodies therefrom, impregnating these bodies with silicofluoric acid, and burning the bodies until the silicofluorid of sodium is driven off.

2. The herein described method of producing acid- and fire-proof bodies of pure silicic acid anhydrid, which consists in soaking masses of silicic acid (silica, quartz, sand) with solutions of water-glass, forming bodies therefrom, impregnating these bodies with silicofluoric acid, heating the bodies up to such a temperature that only the fluorid of silicon formed from the silicofluorid of sodium then produced is driven off and can be collected in water for turning into silicofluoric acid which can be used over again, whereupon the temperature is so much increased as to drive off also the fluorid of sodium formed.

3. The herein described method of producing acid- and fire-proof bodies of pure silicic acid anhydrid, which consists in mixing masses of silicic acid (silica, quartz, sand) with alkali silicates, soaking the mixture with water, forming bodies from the soaked mixture, impregnating these bodies with silicofluoric acid, and burning the bodies until the silicofluorid of sodium is driven off.

4. The herein described method of producing acid- and fire-proof bodies of pure silicic acid anhydrid, which consists in mixing masses of silicic acid (silica, quartz, sand) with alkali silicates, soaking the mixture with water, forming bodies from the soaked mixture, impregnating these bodies with silicofluoric acid, heating the bodies up to such a temperature that only the fluorid of silicon formed from the silicofluorid of sodium then produced is driven off and can be collected in water for turning into silicofluoric acid which can be used over again, whereupon the temperature is so much increased as to drive off also the fluorid of sodium formed.

ISRAEL SCHLOSSBERG.

Witnesses:
HENRY HASPER,
ARTHUR SCHROEDER.